Figure 1:
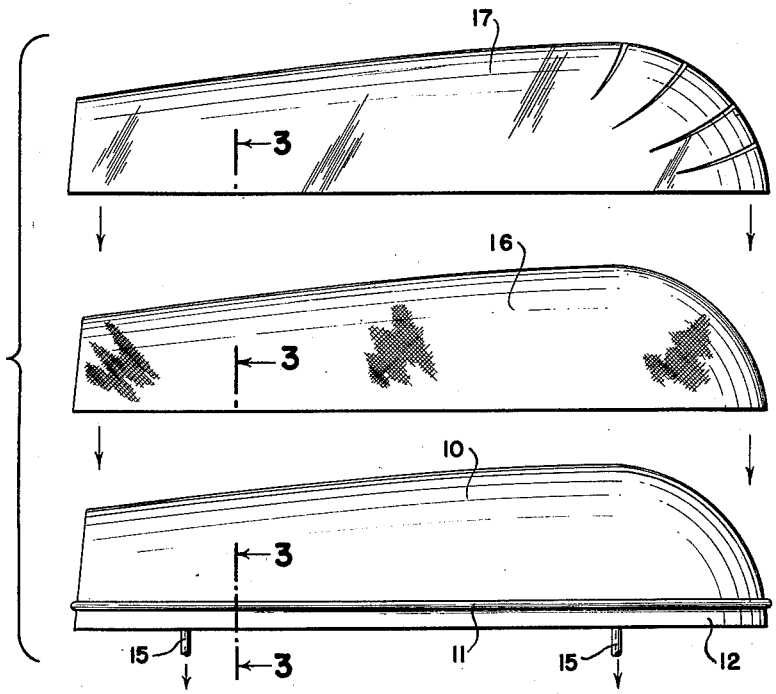

Dec. 3, 1957   C. DE GANAHL ET AL   2,815,309
METHOD OF MAKING MOLDED PLASTIC ARTICLES
Filed Aug. 31, 1955

INVENTORS
Carl de Ganahl
Walter B. Kleiner
George N. Carmichael

BY Pennie, Edmonds, Morton, Barrows & Taylor
ATTORNEYS

United States Patent Office 2,815,309
Patented Dec. 3, 1957

2,815,309

METHOD OF MAKING MOLDED PLASTIC ARTICLES

Carl de Ganahl, Greenlawn, N. Y., and Walter B. Kleiner, Dunellen, and George N. Carmichael, South Amboy, N. J.; said Kleiner and said Carmichael assignors to said de Ganahl Application August 31, 1955, Serial No. 531,794

6 Claims. (Cl. 154—110)

This invention relates to the manufacture of molded plastic articles.

Molded reinforced plastic articles have heretofore been manufactured from fibrous reinforcing material impregnated with a thermosetting liquid plastic composition by forming or molding the plastic impregnated material between matching male and female mold sections, followed by heating of the mold to cure the thermosetting plastic material therein. However, in the manufacture of large molded plastic articles such as boat hulls, automobile bodies and the like, the cost of preparing matching mold sections and the difficulty in manipulating the mold sections during the molding operation have led to the development of the so-called "bag molding" procedure. In this procedure a layer of the fibrous reinforcing material coated and impregnated with liquid thermosetting plastic composition is applied to the surface of a mold form that corresponds either to the male or the female mold section heretofore mentioned, and then an air-tight bag of rubber or rubberized fabric is applied over the layer of plastic-impregnated reinforcing material. The bag is shaped or fitted so that it fits closely over the layer of plastic-impregnated reinforcing material and is adapted to form an air-tight seal along the peripheral edge with the mold form. This air-tight seal is established and then substantially all air is withdrawn from the space defined by the mold form and the bag so that the bag is pressed firmly by atmospheric pressure against the plastic impregnated reinforcing material. The atmospheric pressure can be augmented by mechanical means (for example, a complementary mold form) or by the pressure of steam or a compressed gas applied to the outer surface of the bag. The plastic composition in the mold is then heated by any appropriate means to cure the plastic, whereupon the bag is removed from over the resulting molded reinforced plastic article and the plastic article is removed from the mold form for subsequent use.

A wide variety of useful reinforced plastic articles can be produced by the foregoing molding procedure. However, in certain applications the plastic article is subject to physical and chemical attack that results in gradual to rapid deterioration of the article. For example, plastic boat hulls manufactured as described gradually deteriorate due to the effect of water which attacks both the plastic material of the hull and the reinforcing material presumably protected thereby. Moreover, in bag molding operations difficulty is frequently encountered in removing the bag from the molded plastic article, and when the bag is removed the exposed surface of the finished article often is objectionably rough and uneven.

To overcome these and related problems, we have devised a greatly improved bag molding procedure wherein the bag is formed from reactive plastic sheet material that becomes chemically bonded to the surface of the reinforced plastic body of the molded article in the course of the curing operation. As a consequence, the difficulty formerly encountered in removing the bag from the finished article is completley eliminated. Moreover, the resulting molded article has a surface that is smooth and without unpredictable irregularities, that is impervious to water and other common fluids, and that is highly resistant to physical and chemical attack.

The improvement in molded plastic articles manufactured pursuant to our invention is due to the incorporation in the plastic structure of the reactive plastic bag employed in the molding operation. The reactive plastic bag is formed from a calendered film of a plastic composition comprising a homogeneous mixture of from about 45% to 75% by weight of thermoplastic vinyl polymers, from about 10% to 50% by weight of polymerizable thermosetting epoxide resins, and from about 0.3% to 10% by weight of a polymerization catalyst for the epoxide resins. The thermosetting epoxide resin constituent of the film serves as a plasticizer for the thermoplastic vinyl polymers therein and may be used as such without the addition of other plasticizing substances, in which case the minimum permissible amount of the reactive plasticizer constitutes about 25% by weight of the composition. When the composition contains less than 25% by weight of the reactive plasticizer, an effective amount, comprising from about 1% to 45% by weight of the composition, of other plasticizers for the vinyl polymers are incorporated in the composition.

Our improved method of making molded reinforced plastic articles comprising applying over the surface of a mold form a layer of fibrous reinforcing material thoroughly coated and impregnated with a thermosetting liquid plastic composition, and applying over the layer of plastic impregnated reinforcing material an air-tight bag formed from our reactive plastic material, the bag being shaped or fitted to fit fairly closely over the layer of plastic impregnated reinforcing material. An air-tight seal is established between the peripheral edge of the mold form and the peripheral edge of the air-tight reactive plastic bag, and substantially all air is withdrawn from the space defined by the mold form and the air-tight plastic bag. The plastic compositions on the mold form are then heated to soften and fuse the thermoplastic constituents and to cure the thermosetting constituents thereof, thereby forming a monolithic plastic structure comprising a fiber reinforced molded plastic body to which is chemically bonded a protective layer of thermoset plastic formed from the reactive plastic bag employed in our bag molding procedure. After allowing the cured plastic to cool, the resulting molded article is removed from the mold form for subsequent use.

The finished molded plastic article is characterized by a strong, fiber reinforced plastic body having a smooth surface impervious to most fluids with which the article will come into contact in its usual service. The thermosetting material of the molded plastic body forms a coherent plastic structure through which extends the fibrous reinforcing material and to which is chemically bonded the surface layer of vinyl-and-epoxide resin containing film. The thermosetting resin of the plastic body preferably is either an epoxide or alkyd polyester resin. In addition, for a specially severe service the molded plastic structure can include one or more additional layers of polyvinyl film fusion-bonded to the outer surface of the vinyl-and-epoxide resin layer of the article. Moreover, a layer of the vinyl-and-epoxide resin composition can be applied to the surface of the mold for before the layer of plastic impregnated fibrous reinforcing material is applied thereto so that the finished molded plastic article will have a protective layer of impervious plastic on both surfaces or sides of the fiber-reinforced plastic body.

Figure 2:
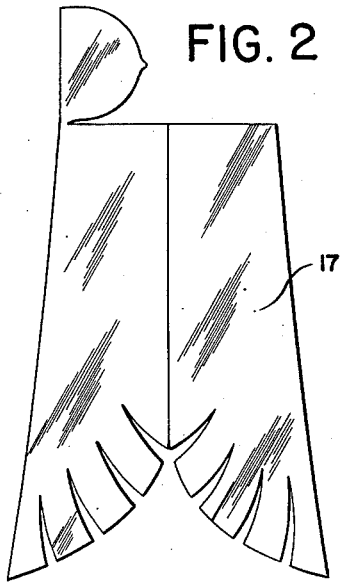
Figure 3:
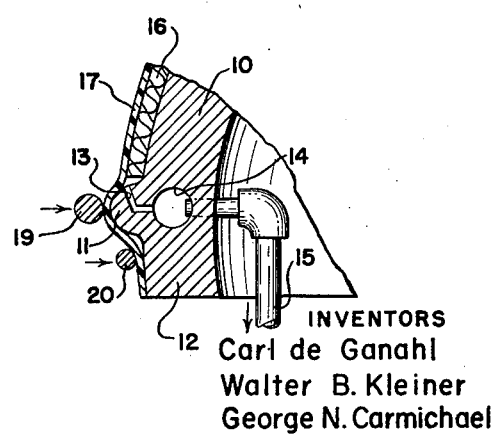

The method of making molded plastic articles pursuant to our invention, and the improved plastic articles produced thereby, will be better understood from the following description taken in conjunction with the accompanying drawing in which:

Fig. 1 is an exploded view of a plastic boat hull as molded pursuant to our invention, Fig. 2 is a plan view of the reactive plastic film cut to a pattern that can be shaped and fitted to form an airtight plastic bag for use in our process, and Fig. 3 is a fragmentary sectional view along line 3—3 of Fig. 1 showing the plastic boat hull and mold form in the course of our molding operation.

A particularly useful application of our invention, namely the manufacture of a molded reinforced plastic boat hull, is shown in the drawing. As shown in Fig. 1, a mold form 10 shaped to conform to the interior surface of the boat hull being produced is fabricated from metal or similar material capable of withstanding the manufacturing operations, such as the application of heat and chemicals, involved in our process. (In this connection it should be noted that for most purposes it is preferable to employ a mold form that conforms to the interior shape of the article to be molded, although it is sometimes advantageous to employ a mold form that will define the exterior surface of the article. It will be readily seen from the following description that the method of our invention applies equally to both male and female types of mold forms.) The peripheral edge of the working surface of the mold form is defined by a rim or bead 11, and a skirt portion 12 is advantageously provided adjacent the bead 11 to facilitate the establishment of an air-tight seal between the mold form and the reactive plastic bag, as hereinafter described. The mold form is further provided with means for withdrawing air from the space defined by the mold form and the plastic bag in sealed relation thereto. As shown in Fig. 3, such means advantageously comprises a plurality of bleeder lines 13 spaced a short distance apart about the bead 11, the bleeder lines communicating with the upper surface of the bead 11 and with a manifold 14 that, in turn, is connected by means of suction lines 15 to a vacuum pump (not shown).

The surface of the mold form 10 is prepared to receive the plastic materials to be applied thereto, and then a layer of fibrous reinforcing material 16 thoroughly coated and impregnated with a thermosetting liquid plastic composition is applied over the surface of the mold form. The fibrous reinforcing material is advantageously a felted mat or woven fabric of glass fibers, although other useful reinforcing materials include linen or cotton fabric, fabrics of synthetic fibers such as high strength nylon or rayon, and wood veneer. The liquid plastic composition with which the reinforcing materials are coated and impregnated preferably contains as its essential thermosetting constituent polymerizable epoxide or alkyd polyester resins. The plastic impregnated fibrous material is applied over the mold form 10 in a layer of the desired thickness, advantageously composed of a number of laminations of the reinforcing material, so that it completely covers the surface of the mold form up to the peripheral edge thereof defined by the bead 11.

After the fibrous reinforcing material 16 is applied to the mold form 10, a bag 17 formed from reactive plastic sheet material is applied thereover. The sheet material from which the bag is formed is cut in a pattern that can be assembled to form a bag fitting closely over the layer of plastic material. For example, in the case of the manufacture of a plastic boat such as that shown in the drawing, a large sheet of the reactive plastic material can be cut in the pattern shown in Fig. 2. Sheet material cut in this (or an equivalent) pattern is then laid over a jig or form having a shape corresponding to the outer surface of the boat hull, and the seams of the patterned film are fastened together by means of a hot iron in the manner known in the plastics art. Alternatively, the bag can be formed from lengths of relatively wide plastic tape that are fastened together as described after being laid longitudinally on the jig or form much as the planking of a boat is laid longitudinally on the ribs thereof. In any case the resulting air-tight plastic bag is applied over the plastic impregnated fibrous body of the article in the manner indicated in Fig. 1 of the drawing.

When the plastic bag 17 is applied over the layer of plastic impregnated reinforcing material 16, the peripheral edge portion of the bag extends past the bead 11 that defines the peripheral edge of the mold form. An airtight seal is established between the mold form 10 and the plastic film 17 by means of a hoop 19 or other device that squeezes the plastic film tightly against the bead 11. In addition, a supplementary hoop 20 or equivalent device can be provided to squeeze the dependent portion of the plastic bag 17 against the skirt portion 12 of the mold form. After the air-tight seal has been thus established, air is withdrawn from the space defined by the mold form and the plastic bag by means of the suction line 15, as indicated in Fig. 3. As the air is withdrawn from beneath the plastic bag, atmospheric pressure presses the bag firmly against the underlying plastic impregnated fibrous reinforcing material.

After substantially all air is evacuated as described, the plastic materials on the mold form are heated to soften and fuse the thermoplastic constituents thereof and to cure the thermosetting constituents thereof. Heat may be applied by any appropriate means, as by a radiant heat source or by transferring the mold with the plastic material thereon to a suitable oven. After heating the plastic materials at a temperature of about 350° F. for about 30 minutes, advantageously followed by a post-cure heat treatment of several hours at curing temperature, the resulting molded plastic article is allowed to cool to room temperature, whereupon it is removed from the mold form for subsequent use.

If it is desired to provide the molded plastic article produced by the method of our invention with an impervious plastic layer on the inner surface of the article as well as on the outer surface thereof, a layer of our reactive plastic sheet material is first applied over the surface of the mold form 10 before the layer of plastic impregnated reinforcing material 16 is applied thereover. Thus, when the several layers of plastic materials on the mold form are heated as described, the resulting molded plastic article will have a smooth and impervious layer of cured reactive plastic film on both the interior and exterior surfaces thereof. As a consequence, the resulting monolithic plastic structure will be characterized by the high degree of resistance to physical and chemical attack of both inner and outer surface of the molded plastic article.

In addition to the layer of reactive plastic film on the outer surface of the reinforced plastic article, we advantageously can also provide a supplementary layer of vinyl polymers exteriorly of the said reactive plastic layer. The layer of vinyl polymers is incorporated in the plastic structure by applying to the surface of the reactive plastic bag a plasticized film of thermoplastic vinyl material (comprising, say, 60% vinyl chloride and 40% dioctyl phthalate). The said layer of vinyl polymers becomes fusion-bonded to the vinyl constituents of the reactive plastic film in the course of the curing operation, and when the cure is finished the vinyl layer forms an exceptionally tough protective layer that is resistant to attack by most physical and chemical agents. Similarly, when the plastic structure includes a layer of vinyl-and-epoxide resin film on the interior surface of the reinforced plastic body of the plastic structure, a layer of vinyl polymers can be fusion-bonded to the vinyl constituent of this inner plastic layer by employing procedures corresponding to those described above.

The reactive plastic composition from which the bag 17 is fabricated is essentially a homogeneous mixture of thermoplastic vinyl polymers and polymerizable thermosetting epoxide resins. The thermoplastic vinyl polymer constituent of the composition contributes strength and body to the calendered film of the composition prior to curing of the thermosetting material, and contributes to the resistance to physical and chemical attack and to the strength and toughness of the composition after it has been cured. The thermosetting epoxide resin constituent of the plastic composition serves as a plasticizer for the vinyl polymer prior to curing of the composition, and after curing forms with the vinyl polymer a hard and impervious surface on the outside of the molded article. The reactive plastic composition also contains a catalyst to promote subsequent polymerization of the epoxide material therein, and can advantageously include plasticizers for the vinyl polymers (in addition to the epoxide resins).

The vinyl polymer constituent of the plastic composition from which the reactive plastic bag is made comprises from about 45% to 75% by weight of the composition. We have found that plastic films having compositions containing significantly greater amounts of vinyl polymers tend to be hard and stiff and, consequently, difficult to handle. Compositions containing significantly lesser amounts of vinyl polymers tend to be too soft and tacky and to exude its plasticizing constituent. The vinyl compounds we have found useful in our composition include polymers and copolymers of vinyl chloride, vinyl acetate, vinylidine chloride and vinyl butyral. Of these we presently prefer to use a copolymer comprising about 96% vinyl chloride and 4% vinyl acetate.

The thermosetting epoxide resin constituent of our plastic composition comprises from about 10% to 50% by weight thereof. The upper limit of the epoxide resin constituent is determined by the amount of the other constituents, principally the vinyl constituent, present in the composition. However, in no event should the amount of reactive epoxide resin be less than about 10% by weight of the composition, lesser amounts resulting in an imperfect bond between the cured plastic composition and the solid base structure.

The term "epoxide resin" as used in the present specification and in the appended claims denotes the resinous reaction product of certain epoxide compounds and certain polyhydric compounds. Epoxide compounds are those compounds having an ether oxygen atom joined to two vicinal carbon atoms. Polyhydric compounds are those compounds having available hydrogen atoms linked to carbon atoms by oxygen atoms as, for example, polyhydric phenols and polyhydric alcohols. A particularly useful epoxide resin is the reaction product of a epihalohydrin and a polyhydric phenol, as exemplified by bisphenol-epichlorhydrin. Other epoxide resins suitable for use in our reactive plastic composition include the reaction products of epihalohydrins and polyhydric alcohols such as ethylene glycol, propylene glycol, triethylene glycol, and the like. Other equivalent epoxide resins are well known to those skilled in the plastic art.

The epoxide resins are partially polymerized prior to their incorporation in the plastic composition in order to stabilize or fix the resin and to increase its molecular weight and viscosity. The molecular weight of such partially polymerized liquid resins is usually of the order of about 500 to 1000. Moreover, the epoxide resins have intimately mixed therewith an effective amount of one of the known polymerization catalysts (for example, an amine) for such resins. We have found it particularly advantageous to use as a catalyst a substance whose catalyzing action becomes effective only after it has been heated to a temperature in excess of 100° F. The use of such a temperature-triggered catalyst permits the catalyzed plastic composition to be compounded, stored, and applied to the plastic structure without any tendency of the thermosetting material therein to polymerize prematurely due to the presence of the catalyst. Substances that will become polymerization catalysts for epoxide resins when heated to temperatures in excess of 100° F. include certain complex boron trifluoride amines such as borontrifluoride monoethylamine, borontrifluoride triethanolamine, and borontrifluoride piperidine. The amount of catalyst present in the composition will depend upon the effectiveness of the catalyst selected and upon such practical considerations as the length of time that can economically be allotted to the cure of the thermosetting material in the composition. Accordingly, we have found that the effective amount of catalyst in the composition can range from a fraction of one percent up to about 10% by weight thereof.

As hereinbefore noted, the uncured epoxide resin of the composition acts as a plasticizer for the vinyl polymers and may be used as such to the exclusion of other plasticizing substances. In such cases the amount of epoxide resin in the composition ranges from about 25% to 50% by weight thereof, depending upon the amount of vinyl polymers present therein. However, when the composition contains less than about 25% but, of course, more than about 10% by weight of the thermosetting epoxide material, an additional plasticizing substance must be incorporated therein to give the composition the desired physical characteristics. The additional plasticizing substance, which can be present in an effective amount of from about 1% to 45% by weight of the composition, must, of course, be compatible with both the vinyl polymer and the epoxide resin constituents thereof. Useful plasticizers for the vinyl polymers include dioctyl phthalate, diallyl phthalate, fatty acid esters (e. g. ricinoleates), chlorinated paraffins, unsaturated fatty acids (e. g. linseed oil), epoxidized soybean oil, and tricresyl phosphate. Of these we presently prefer to use dioctyl phthalate and diallyl phthalate.

The composition is prepared for use in the form of a homogeneous calendered sheet or film of the various plastic constituents. Vinyl polymers are ordinarily obtained in the form of dry granules or flakes of the material. The dry granules of vinyl material are mixed with the partially polymerized and catalyzed liquid epoxide resin, together with any additional plasticizing substances that may be required. The plastic ingredients are then thoroughly blended by means of heated calendar rolls in the manner known in the art to form a thin sheet or film of homogeneous composition. Although the thickness of the resulting sheet of film is not critical we presently prefer to prepare the film so that it has a thickness of from 0.01 to 0.05 inch.

The following examples are illustrative but not limitative of reacting plastic compositions useful in the practice of our invention. Proportions are given as parts by weight.

*Example I*

200 parts 96% vinyl chloride and 4% vinyl acetate copolymer
120 parts partially polymerized bisphenol-epichlorhydrin of molecular weight of about 830
80 parts bisphenol-epichlorhydrin of molecular weight of about 830 containing 3% of borontrifluoride monoethylamine catalyst

*Example II*

200 parts 96% vinyl chloride and 4% vinyl acetate polymer
20 parts dioctyl phthalate
108 parts bisphenol-epichlorhydrin of molecular weight of about 830
72 parts bisphenol-epichlorhydrin of molecular weight of about 830 catalyzed with 6% borontrifluoride piperidine

*Example III*

200 parts 96% vinyl chloride and 4% vinyl acetate polymer
40 parts tricresyl phosphate 160 parts bisphenol epichlorhydrin of molecular weight of about 830
5 parts borontrifluoride monoethylamine catalyst

Example IV 200 parts vinyl chloride polymer
80 parts dioctyl phthalate
120 parts partially polymerized diethylene glycol-epi-bromhydrin
10 parts borontrifluoride piperidine catalyst

Example V 400 parts vinyl butyral polymer
20 parts linseed oil
144 parts partially polymerized bisphenol-epichlorhydrin
36 parts partially polymerized bisphenol-epichlorhydrin plus 3% of borontrifluoride triethanolamine catalyst

Example VI 70 parts vinyl chloride polymer
10 parts dioctyl phthalate
10 parts diallyl phthalate
10 parts partially polymerized bisphenol-epichlorhydrin of molecular weight of about 830
6 parts borontrifluoride triethanolamine

Example VII 70 parts 96% vinyl chloride and 4% vinyl acetate copolymer
20 parts diallyl phthalate
10 parts partially polymerized trimethylene glycol-epichlorhydrin
6 parts borontrifluoride triethanolamine The method of molding reinforced plastic articles we have devised can be employed in the manufacture of a wide variety of products, as exemplified by the molded plastic boat hull described hereinbefore. From the foregoing description of our invention, it will be seen that we have devised a valuable improvement in the manufacture of such molded plastic articles. Our bag molding method is characterized by the relative simplicity of the molding operation, and the products produced thereby are characterized by the secure chemical bond that exists between the reinforced plastic body of the molded article and the protective layer of our plastic composition on the exterior surface thereof.

We claim:

1. The method of making molded plastic articles which comprises applying to the surface of a mold form a layer of fibrous reinforcing material thoroughly coated and impregnated with a thermosetting liquid plastic composition, the surface of said mold form being defined by a bead extending continuously about the peripheral edge thereof, applying over the layer of said plastic impregnated reinforcing material an air-tight bag of reactive plastic material, said bag being formed from a calendered film of a plastic composition comprising from about 45% to 75% by weight of thermoplastic vinyl polymers plasticized with from about 10% to 50% by weight of polymerizable thermosetting epoxide resins and from about 0.3% to 10% by weight of a polymerization catalyst for said epoxide resins, establishing an air-tight seal between the peripheral edge defining the opening of said air-tight plastic bag and the bead at the peripheral edge of said mold form, withdrawing substantially all air from the space defined by said air-tight bag and said mold form, and heating the plastic compositions on the mold form to cure the plastic compositions thereon.

2. The method of making molded plastic articles which comprises applying to the surface of a mold form a layer of fibrous reinforcing material thoroughly coated and impregnated with a thermosetting liquid plastic composition, the surface of said mold form being defined by a bead extending continuously about the peripheral edge thereof, the essential thermosetting constituent of said liquid plastic composition being selected from the group consisting of the epoxide and alkyd polyester resins, applying over the layer of said plastic impregnated reinforcing material an air-tight bag of reactive plastic material, said bag being formed from a calendered film of a plastic composition comprising from about 45% to 75% by weight of thermoplastic vinyl compounds selected from the group consisting of polymers and copolymers of vinyl chloride, vinyl acetate, vinylidine chloride and vinyl butyral, from about 10% to 50% by weight of thermosetting epoxide resins of molecular weight from about 500 to 1000, from about 0.3% to 10% by weight of a polymerization catalyst for said epoxide resins selected from the group consisting of borontrifluoride monoethylamine, borontrifluoride triethanolamine and borontrifluoride piperidine, and from about 1% to 40% by weight of a plasticizer for said vinyl compounds other than said epoxide resins, establishing an air-tight seal between the peripheral edge defining the opening of said air-tight plastic bag and the bead at the peripheral edge of said mold form, withdrawing substantially all air from the space defined by said air-tight bag and said mold form, and heating the plastic compositions on the mold form to soften and fuse the thermoplastic constituent and to cure the thermosetting constituents thereof.

3. The method of making molded plastic articles which comprises applying to the surface of a mold form a layer of fibrous reinforcing material thoroughly coated and impregnated with a thermosetting liquid plastic composition, the surface of said mold form being defined by a bead extending continuously about the peripheral edge thereof, applying over the layer of said plastic impregnated reinforcing material an air-tight bag of reactive plastic sheet material having the approximate shape of the exterior surface of said layer, said bag being formed from a calendered film of a plastic composition comprising from about 45% to 75% by weight of thermoplastic vinyl polymers plasticized with from about 10% to 50% by weight of thermosetting epoxide resins of molecular weight from about 500 to 1000, from about 0.3% to 10% by weight of a polymerization catalyst for said epoxide resins and from about 1% to 40% by weight of a plasticizer for said vinyl polymers other than said epoxide resins, establishing an air-tight seal between the peripheral edge defining the opening of said air-tight plastic bag and the bead at the peripheral edge of the mold form, withdrawing substantially all air from the space defined by said air-tight bag and said mold form, and heating the plastic compositions on the mold form to soften and fuse the thermoplastic constituent and to cure the thermosetting constituents thereof, thereby forming a monolithic molded plastic article having a fiber reinforced plastic body to at least one surface of which is chemically bonded a protective layer of vinyl-and-thermoset-epoxide plastic.

4. The method of making molded plastic articles which comprises applying to the surface of a mold form a layer of reactive plastic sheet material having a composition comprising from about 45% to 75% by weight of thermoplastic vinyl polymers plasticized with from about 10% to 50% by weight of thermosetting epoxide resins of molecular weight from about 500 to 1000 and from about 0.3% to 10% by weight of a polymerization catalyst for said epoxide resins, the surface of said mold form being defined by a bead extending continuously about the peripheral edge thereof, applying over said layer of reactive plastic sheet material a layer of fibrous reinforcing material thoroughly coated and impregnated with a thermosetting liquid plastic composition, applying over the layer of said plastic impregnated reinforcing material an air-tight bag of said reactive plastic sheet material, effecting an air-tight seal between the peripheral edge defining the opening of said air-tight plastic bag and the bead at the peripheral edge of said mold form, withdrawing substantially all air from the space defined by said airtight bag and said mold form, and heating the plastic compositions of the mold form to soften and fuse the thermoplastic constituents and to cure the thermosetting constituents thereof, thereby forming a monolithic molded plastic article having a fiber reinforced plastic body to both the inner and outer surfaces of which is chemically bonded a protective layer of vinyl-and-thermoset-epoxide plastic.

5. The method of making molded plastic articles which comprises applying to the surface of a mold form an inner layer of thermoplastic sheet material formed of vinyl polymers plasticized with a non-thermosetting plasticizer, the surface of said mold form being defined by a bead extending continuously about the peripheral edge thereof, applying over said inner layer of thermoplastic sheet material an inner layer of reactive plastic sheet material formed from a plastic composition comprising from about 45% to 75% by weight of thermoplastic vinyl polymers plasticized with from about 10% to 50% by weight of thermosetting epoxide resins of molecular weight of from about 500 to 1000 and from about 0.3% to 10% by weight of a polymerization catalyst for said epoxide resins, applying over said inner layer of reactive plastic sheet material a layer of fibrous reinforcing material thoroughly coated and impregnated with a thermosetting liquid plastic composition, applying over said layer of plastic impregnated reinforcing material an outer layer of said reactive plastic sheet material, applying over said outer layer of reactive plastic sheet material an outer layer of said thermoplastic sheet material, establishing an air-tight seal between the peripheral edges of said outer layers of plastic sheet material and the bead at the peripheral edge of said mold form, withdrawing substantially all air from the space defined by said outer layers of plastic sheet material and said mold form, and heating the plastic compositions on the mold form to soften and fuse the thermoplastic constituents and to cure the thermosetting constituents thereof.

6. The method of making a molded reinforced plastic boat hull which comprises applying to the surface of a mold form shaped to conform to the interior surface of the boat hull a layer of fibrous reinforcing material thoroughly coated and impregnated with a thermosetting liquid plastic composition, the surface of said mold form being defined by a bead extending continuously about the peripheral edge thereof, applying over the layer of said plastic impregnated reinforcing material an air-tight bag of reactive plastic sheet material shaped to conform approximately to the exterior surface of said boat hull, said bag being formed from a calendered film of a plastic composition comprising from about 45% to 75% by weight of thermoplastic vinyl polymers plasticized with from about 10% to 50% by weight of thermosetting epoxide resins of molecular weight from about 500 to 1000 and from about 0.3% to 10% by weight of a polymerization catalyst for said epoxide resins, establishing an air-tight seal between the peripheral edge defining the opening of said air-tight plastic bag and the bead at the peripheral edge of said mold form, withdrawing substantially all air from the space defined by said air-tight bag and said mold form, and heating the plastic compositions on the mold form to soften and fuse the thermoplastic constituent and to cure the thermosetting constituent thereof, thereby forming a monolithic molded plastic boat hull having a fiber reinforced plastic body to the outer surface of which is chemically bonded a protective layer of vinyl-and-thermoset-epoxide plastic.

References Cited in the file of this patent

UNITED STATES PATENTS

| | | |
|---|---|---|
| 2,222,003 | Sloan | Nov. 19, 1940 |
| 2,370,322 | Nebesar | Feb. 27, 1945 |
| 2,531,218 | Johnson | Nov. 21, 1950 |
| 2,591,539 | Greenlee | Apr. 1, 1952 |
| 2,682,515 | Naps | June 29, 1954 |